United States Patent [19]

Lierl

[11] Patent Number: 4,464,125

[45] Date of Patent: Aug. 7, 1984

[54] MAGNETIC TOY CART

[76] Inventor: Theodore J. Lierl, 8440 Jonfred Ct., Cincinnati, Ohio 45231

[21] Appl. No.: 441,485

[22] Filed: Nov. 15, 1982

[51] Int. Cl.³ .................... G09B 1/08; A63H 33/26
[52] U.S. Cl. ................................ 434/330; 446/129; 273/1 M
[58] Field of Search .............. 434/259, 330, 168; 46/236, 238, 242; 273/1 GD, 1 M

[56] References Cited

U.S. PATENT DOCUMENTS

| | | | |
|---|---|---|---|
| 2,707,106 | 4/1955 | Cunningham | 273/109 X |
| 2,961,796 | 11/1960 | Davis | 273/109 X |
| 3,074,206 | 1/1963 | Fischl-Bernfi et al. | 273/109 X |
| 3,134,595 | 5/1964 | Chenoweth et al. | 273/109 X |
| 3,217,446 | 11/1965 | Stiert | 46/242 |
| 3,496,653 | 2/1970 | Wolfner | 434/168 |
| 3,550,936 | 12/1970 | Puttick | 272/8 N |
| 3,625,514 | 12/1971 | Haaland | 273/153 J X |
| 4,102,038 | 7/1978 | Eagan | 29/592 R |
| 4,286,952 | 9/1981 | Roche | 434/259 |
| 4,295,832 | 10/1981 | Karell | 434/168 |

OTHER PUBLICATIONS

"Space Trix", Advertisement of H. Fislove & Co., 1 page.
Welch Scientific Apparatus and Supplies, Title Page and Page 171.

Primary Examiner—William H. Grieb
Attorney, Agent, or Firm—Wood, Herron & Evans

[57] ABSTRACT

A toy is provided including individual receiving means each having magnetic means, and being marked with an identifying indicia. The receiving means are adapted to receive insertion means having magnetic means and are marked with identifying indicia matching the identifying indicia of at least one of the individual receiving means, such that the magnetic means of receiving and insertion means having matching identifying indicia repel one another.

12 Claims, 1 Drawing Figure

U.S. Patent
Aug. 7, 1984
4,464,125
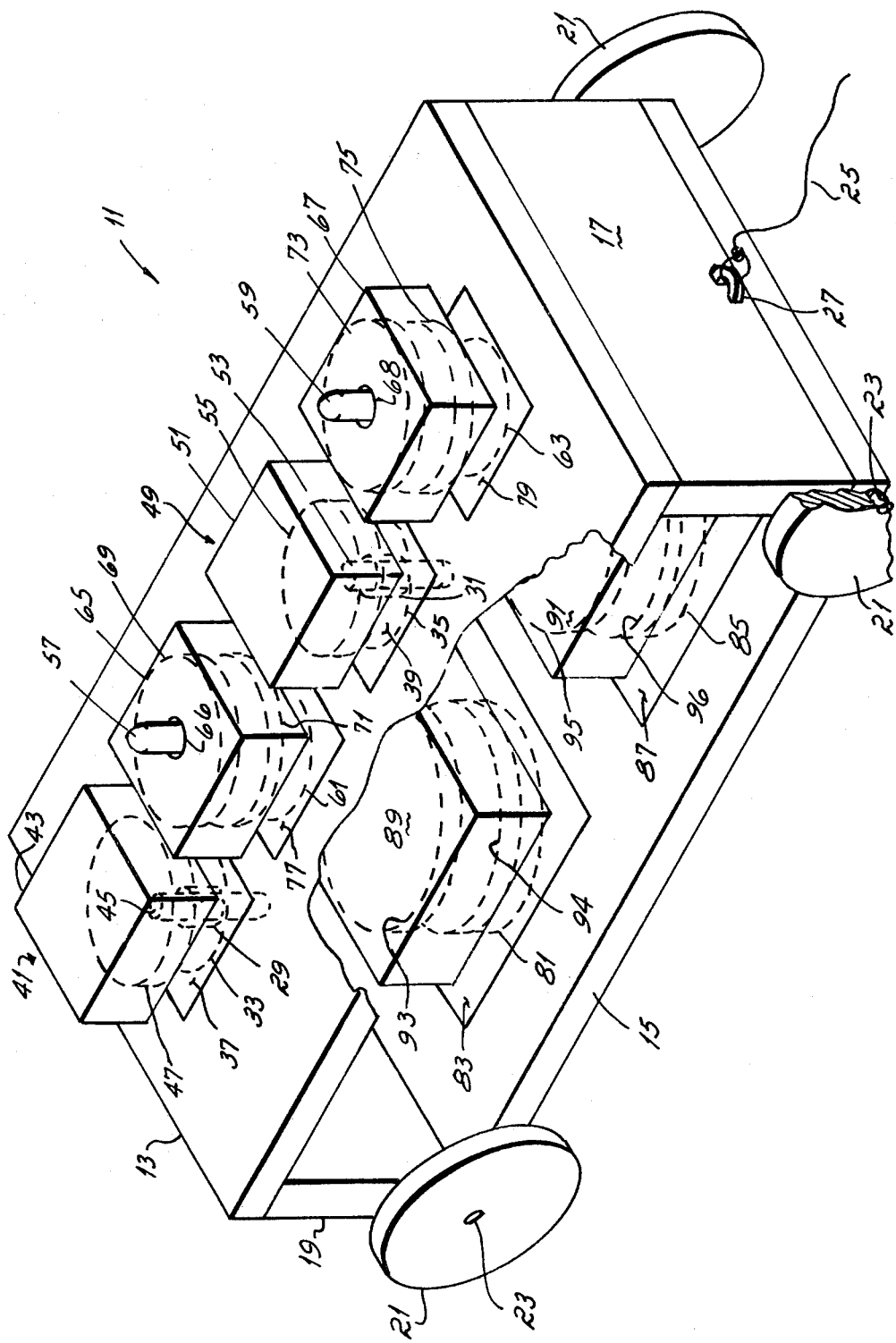

MAGNETIC TOY CART

FIELD OF THE INVENTION

This invention relates generally to educational toys, and in particular, to a toy cart having a frame formed with a plurality of magnetized sections marked with an identifying indicia which are adapted to receive and repel magnetic elements marked with matching identifying indicia for the amusement and education of children.

BACKGROUND OF THE INVENTION

Many types of magnetic toys have been designed for children. There are devices to play games of chance as disclosed in U.S. Pat. No. 2,707,106, while others are designed to provide competition between two or more players as for example in U.S. Pat. Nos. 3,134,595 and 4,102,038. Other designs of educational or amusement devices employing magnets involve manipulation of the magnetic elements and in some instances provide visual effects. See for example, U.S. Pat. Nos. 3,074,206; 4,295,832 and 2,961,796. Most of the devices described in these patents are relatively expensive to construct and often have little or no educational value.

It is therefore an object of this invention to provide a magnetic toy which is relatively inexpensive and simple to construct.

It is another object of this invention to provide a magnetic toy which involves the placement of individual magnetic elements having identifying indicia into engagement with sections of a toy cart frame having matching identifying indicia for the education and amusement of children.

SUMMARY OF THE INVENTION

These and other objectives are provided in this invention of an educational, magnetic toy cart. The toy cart consists of an upper plate and lower plate connected by front and back panels in an essentially rectangular configuration. Wheels are mounted on axles or pins to the lower plate and a pull string is attached to the front panel so that the assembly may be wheeled around as a cart.

As described in more detail below, the upper plate of the cart is formed with one or more spaced bores and one or more upwardly extending pegs. The surface area of the upper plate is divided into separate sections surrounding each of the bores and pegs, and an annular-shaped magnet is embedded in the upper plate within each of such sections with the face or side of the magnet nearest the surface of the upper plate having a positive or negative polarity. In addition, the separate sections are marked with a particular identifying indicia which may be a certain color, shape or the like.

Insert elements are provided having a head section and a stem section, which stem section is adapted to be inserted into the bores formed in the surface of the upper plate. An annular magnet is embedded in the lower portion of the head section immediately adjacent to the stem with its face or side nearest the surface of the lower portion having a positive or negative polarity. Each of the insert elements is marked with an identifying indicia matching the identifying indicia of one of the sections on the upper plate surrounding the bores formed therein. Insert elements and sections having matching indicia are provided with magnets having faces of the same polarity so that the insert elements are repelled from the upper plate of the cart frame making it appear that they are floating within the top plate bores. If the indentifying indicia of the insert elements and top plate sections do not match, the magnets they contain attract.

In addition, blocks formed with a central bore are provided which include annular magnets embedded in their upper and lower surfaces having faces or sides closest to such surfaces of the same polarity. The blocks are adapted to be inserted over the upstanding pegs formed in the upper plate. The pegs and blocks include identifying indicia, and those blocks and pegs having matching identifying indicia are provided with magnets having faces of the same polarity so that they repel one another, making the blocks appear to be suspended over the upper plate when placed over the peg.

In one embodiment of this invention, the lower plate may be divided into sections each marked with an identifying indicia in which magnets having faces or sides of plus or minus polarity are embedded. Blocks or disks also having an identifying indicia and one or more magnets embedded therein are also provided. The polarity of the faces or sides of the magnets in the blocks and lower plate having the same or matching identifying indicia is opposite so that they attract one another. Children placing a disk having an identifying indicia which matches that on one of the sections of the lower plate will thus find that the disk is attracted to the lower plate.

DESCRIPTION OF THE DRAWINGS

The structure operation advantages of this invention will become apparent upon consideration of the following discussion taken in conjunction with the accompanying drawings wherein:

FIG. 1 is a perspective view in partial cross-section of the educational magnetic toy cart of this invention.

DETAILED DESCRIPTION OF THE INVENTION

Referring now to the drawing, a magnetic toy cart according to this invention is shown and labeled with the reference numeral 11. The framework of the cart 11 consists of an upper plate 13 and lower plate 15 which are connected by a front panel 17 and back panel 19. Wheels 21 are mounted to pins 23 attached to the lower plate 15 so that the cart 11 may be rolled along using a pull string 25 attached to a bracket 27 mounted on front panel 17. It should be understood that while cart 11 is shown with wheels and a generally rectangular configuration, it is contemplated that the shape of the cart could be modified as desired and the wheels eliminated or positioned differently.

The upper plate 13 is formed with a pair of spaced, through bores 29 and 31. An annular-shaped magnet 33 having a positive polarity is concentrically disposed about the bore 29 and embedded in upper plate 13. A second annular-shaped magnet 35 having a negative polarity is concentrically disposed about the second bore 31 and embedded in the surface of upper plate 13. In the preferred embodiment of this invention, a section 37 of the surface of upper plate 13 immediately above magnet 35 is provided and marked with an identifying indicia. For purposes of the present discussion, assume the identifying indicia of section 37 is the color blue. Similarly, a section 39 is provided in the surface of upper plate 13 immediately above second magnet 35 which is also marked with an identifying indicia. Assume the identifying indicia of section 39 is the color green.

A first insert element 41 is provided which is formed with a head section 43 connected to a downwardly extending stem 45. An annular magnet 47 having a positive polarity is embedded in the lower surface of head section 43 immediately above the downwardly extending stem 45. Additionally, a second insert element 49 is provided and formed with a head section 51 connected to a downwardly extending stem 53. An annular magnet 55 having a negative polarity is embedded in the lower surface of head section 51 immediately above the connecting stem 53. For purposes of the present discussion, assume that the first insert element 41 is marked with the color blue as an identifying indicia and the second insert element 49 is marked with the color green as an identifying indicia. It should be understood that each annular-shaped magnet embedded in the framework or inserts of cart 11 conventionally includes a positive polarity on one face or side and a negative polarity on the opposite face or side, and reference to a magnet having a given polarity is intended to refer to that side of the magnet which faces outwardly or closest to the surface in which it is embedded.

The stem portions 45 and 53 of the insert elements 41, 49, respectively, are adapted to be inserted into the bores 29, 31. The educational aspect of cart 11 is to teach a child to place the element 41 or 49 having an identifying indicia or color, into the bore 29, 31 surrounded by the section 37 or 39 on upper plate 13 having the matching identifying indicia or color. As shown in the drawing, the first insert element 41 assumed to be colored blue has been inserted into the bore 29 of section 37 also assumed to be colored blue. The polarity of the magnet 33 embedded in section 37 and the magnet 47 embedded in insert element 41 are the same and repel one another. Therefore the first insert element 41 appears to float within bore 29 in a position where it can be spun and bounced against the upper plate 13, thus indicating to the child that the identifying indicia of the first insert element 41 and section 37 match. The same result is obtained by placing the second insert element 49 (colored green) into bore 31 which is surrounded by the section 39 having a green identifying indicia. The magnet 55 of second insert element 49 has the same polarity as the magnet 35 embedded in section 39 and thus the second insert element 49 is suspended above the surface of upper plate 13.

By reversing the position of insert elements 41, 49 so that their identifying indicia or color does not match the identifying indicia of sections 37, 39, respectively, the insert element 41, 49 will be attracted to the surface of upper plate 13 in a position where they cannot be easily played with indicating to the child that the insert elements 41, 49 are positioned incorrectly.

Using the same idea, the upper plate 13 of cart 11 further includes a first upright peg 57 and a second upright peg 59 which are spaced from one another and from the bores 29, 31. Annular magnets 61 and 63 are embedded in the upper plate 13 immediately adjacent to pegs 57, 59 respectively. In the embodiment of this invention shown in the drawing, magnet 61 has a positive polarity and magnet 63 a negative polarity. A first block 65 having a central bore 66 and second block 67 having a central bore 68 are provided, and the central bores 66, 68 are formed so that the blocks 65, 67 may be inserted over pegs 57, 59. In this embodiment, an upper annular magnet 69 is embedded near the upper surface of block 65 and a lower annular magnet 71 is embedded in the lower surface of block 65, with both magnets 69, 71 having a positive polarity. Similarly, an upper annular magnet 73 is embedded in the upper surface of block 67 and a lower annular magnet 75 is embedded in the lower surface of block 67 with both magnets 73, 75 having a negative polarity.

A section 77 of upper plate 13 surrounding peg 57 immediately above magnet 61 is marked with an identifying indicia which for purposes of discussion will be assumed to be the color blue. Similarly, a section 79 adjacent to peg 59 in upper plate 13 immediately above magnet 63 is colored with a green identifying indicia. In the embodiment of this invention shown in the drawing, and given that sections 77, 79 are marked with the identifying indicia described above, the block 65 having magnets 69, 71 is marked with the color blue as an identifying indicia. The block 67 having magnets 73, 75 of negative polarity is marked with a green identifying indicia.

When the blue colored block 65 is placed over peg 57, the magnets 69, 71 of positive polarity embedded therein repel the magnet 61 embedded in section 77 surrounding peg 57. The child learns that the blue colored block 65 matches the blue colored section 77 surrounding peg 57 since the block 65 remains above upper plate 13 in a position to be manipulated. As also shown in the drawing, the green colored block 67 having negative polarity magnets 73, 75 is not attracted to upper plate 13 when placed over peg 59 and in the field of magnet 63 having the same negative polarity. In that instance, the child learns that the green colored block 67 matches the green colored section 79 on the surface of upper plate 13. By reversing the position of blocks 65, 67 so that their identifying indicia do not match with the indentifying indicia of sections 77, 79, respectively, the blocks 65, 67 will be attracted to the upper plate 13.

If desired, a variation of the idea described above in connection with the configuration of upper plate 13 may be used in constructing the lower plate 15. In FIG. 1, lower plate 15 includes a first annular magnet 81 of positive polarity embedded in the upper surface of lower plate 15 immediately beneath a segment 83 which is assumed to be colored blue. A second annular magnet 85 of negative polarity is spaced from first magnet 81 and also embedded in the upper surface of lower plate 13 within a segment 87 assumed to be colored green. A pair of blocks or disks 89, 91, marked with the colors blue and green as identifying indicia, respectively, are provided for positioning on the lower plate 15. Disk 89 has a pair of annular magnets 93, 94 of negative polarity embedded therein, and disk 91 includes a pair of annular magnets 95, 96 of positive polarity embedded therein adjacent its upper and lower surfaces. By placing the blue colored disk 89 over the blue colored segment 83 of lower plate 15, a child will have properly matched the identifying indicia and finds that the magnets 93, 94 of disk 89 are attracted to the magnet 85 of segment 83. The same result occurs when the green colored disk 91 is placed over the green colored segment 87. In this embodiment, disks and blocks with matching identifying indicia attract one another so that the disks may be readily placed on lower plate 15.

The cart 11 of this invention therefore aids small children in recognizing matching identifying indicia by placing marked objects into contact with means for receiving the object which are similarly marked. It should be understood that while the segments or sections of the upper and lower plates and the insert elements or blocks were assumed to be marked with a certain color as an identifying indicia, other identifying indicia could be utilized and are considered in the scope of this invention. For example, the shape of bores 29, 31 and insert elements 41, 49 could be modified such that the stems 45, 53 of the insert elements 41, 49 are adapted to fit within the correspondingly shaped bore in upper plate 13. Alternately, the shape of the sections 37, 39 in upper plate 13 and the shape of the head sections 43, 51 of insert elements 41, 49 could be formed in a given matching configuration to thus act as identifying indicia. In addition, the number, (for example, a single bore and/or peg) location and particular color or shape of the bores, pegs and insert elements on upper plate 13 may be altered as desired to achieve a particular design, for example, or for some other educational purpose. Similar modifications could be made to the configuration of lower plate 15 and the disks 89, 91 adapted to be placed thereon.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A toy comprising:
   a plate formed with at least two sections each having bores extending therethrough, said sections being marked with an identifying indicia;
   individual first magnets disposed in said sections of said plate;
   insertion elements each including a head section connected to a stem section, each of said insertion elements being marked with an identifying indicia matching said identifying indicia of at least one of said sections;
   individual second magnets disposed in said head section of each of said insertion elements;
   said stem sections of said insertion elements being adapted to be inserted within said bores, said sections of said plate and said head section of said insertion elements marked with matching identifying indicia having first magnets and second magnets, respectively, which repel one another.

2. The toy of claim 1 wherein said individual first magnets are annular magnets concentrically disposed about said bore in said sections of said plate.

3. The toy of claim 1 wherein said individual second magnets are annular magnets mounted in said head section of said insertion elements immediately adjacent said stem section.

4. The toy of claim 1 wherein said identifying indicia are colors, said sections of said plate and said insertion elements having matching identifying indicia being marked with the same color.

5. The toy of claim 1 wherein said sections of said plate and said insertion elements having non-matching identifying indicia include first and second magnets, respectively, which attract one another.

6. A toy comprising:
   a plate having at least two upright pegs mounted thereto, said plate having sections marked with different identifying indicia surrounding each of said pegs;
   individual first magnets disposed in said sections of said plate adjacent each of said pegs;
   insertion elements each formed with a through bore, each one of said insertion elements being marked with an identifying indicia matching said identifying indicia of at least one of said sections;
   at least one individual second magnet disposed in each of said insertion elements;
   each of said pegs being adapted to fit within said bore of said insertion elements, said sections of said plate and said insertion elements marked with matching identifying indicia having first magnets and second magnets, respectively, which repel one another.

7. The toy of claim 6 wherein said identifying indicia are colors, each of said sections of said plate having an identifying indicia matching said identifying indicia of at least one of said insertion elements being marked with the same color as said insertion elements.

8. The toy of claim 6 wherein said sections of said plate and said insertion elements having non-matching identifying indicia include first and second magnets, respectively, which attract one another.

9. The toy of claim 6 wherein said insertion element is a block formed with a bore.

10. A toy comprising:
    a plate formed with at least two through bores and having at least two upwardly extending pegs mounted thereto, said plate having sections marked with identifying indicia surrounding each of said bores and peg sections;
    individual first magnets disposed in said sections of said plate surrounding each of said bores;
    first insertion elements each including a head section connected to a stem section, each one of said first insertion elements being marked with an identifying indicia matching said identifying indicia of at least one of said sections surrounding said bores;
    individual second magnets disposed in said head section of each of said first insertion elements, said stem section of each of said first insertion elements being adapted to be inserted into said bores formed in said plate, said sections of said plate surrounding said bores and said first insertion elements being marked with matching identifying indicia having first and second magnets, respectively, which attract one another;
    individual third magnets disposed in said sections of said plate surrounding each of said pegs;
    second insertion elements each formed with a through bore, each one of said second insertion elements being marked with an identifying indicia matching said identifying indicia of at least one of said sections surrounding said pegs; and
    at least one individual fourth magnet disposed in each of said second insertion elements, each of said peg sections being adapted to fit within said bores of said second insertion elements, said sections of said plate surrounding said pegs and said second insertion elements being marked with matching identifying indicia having third and fourth magnets, respectively, which repel one another.

11. The toy of claim 10 wherein said identifying indicia are colors, said sections of said plate surrounding said bores and said first insertion elements having matching identifying indicia being marked with the same first color, said sections of said plate surrounding said pegs and said second insertion elements having matching identifying indicia being marked with the same second color, said first and second colors being different.

12. A toy cart comprising:
a lower plate having a top surface formed with at least two sections, each of said sections being marked with an identifying indicia;
an upper plate overlying said lower plate, said upper plate having at least two sections marked with an identifying indicia;
individual first magnets disposed in said top surface of said lower plate within one of said segments marked with identifying indicia;
individual blocks each being marked with an identifying indicia matching the identifying indicia of at least one of said sections on said top surface of said lower plate;
individual second magnets disposed in each of said blocks, said blocks being adapted to contact said sections of said lower plate, said blocks and said sections marked with matching identifying indicia having first and second magnets, respectively, which attract one another;
individual third magnets disposed in said insertion elements;
individual receiving means disposed within said sections of said upper plate having identifying indicia for receiving said insertion elements;
individual fourth magnets disposed in said upper plate adjacent said receiving means, said receiving means being adapted to receive said insertion elements and said receiving means and insertion elements having matching identifying indicia being provided with third and fourth magnets, respectively, which repel one another.

* * * * *